April 21, 1936. C. PILKINGTON 2,038,195
ELECTRIC SYSTEM FOR VEHICLES
Filed April 11, 1935
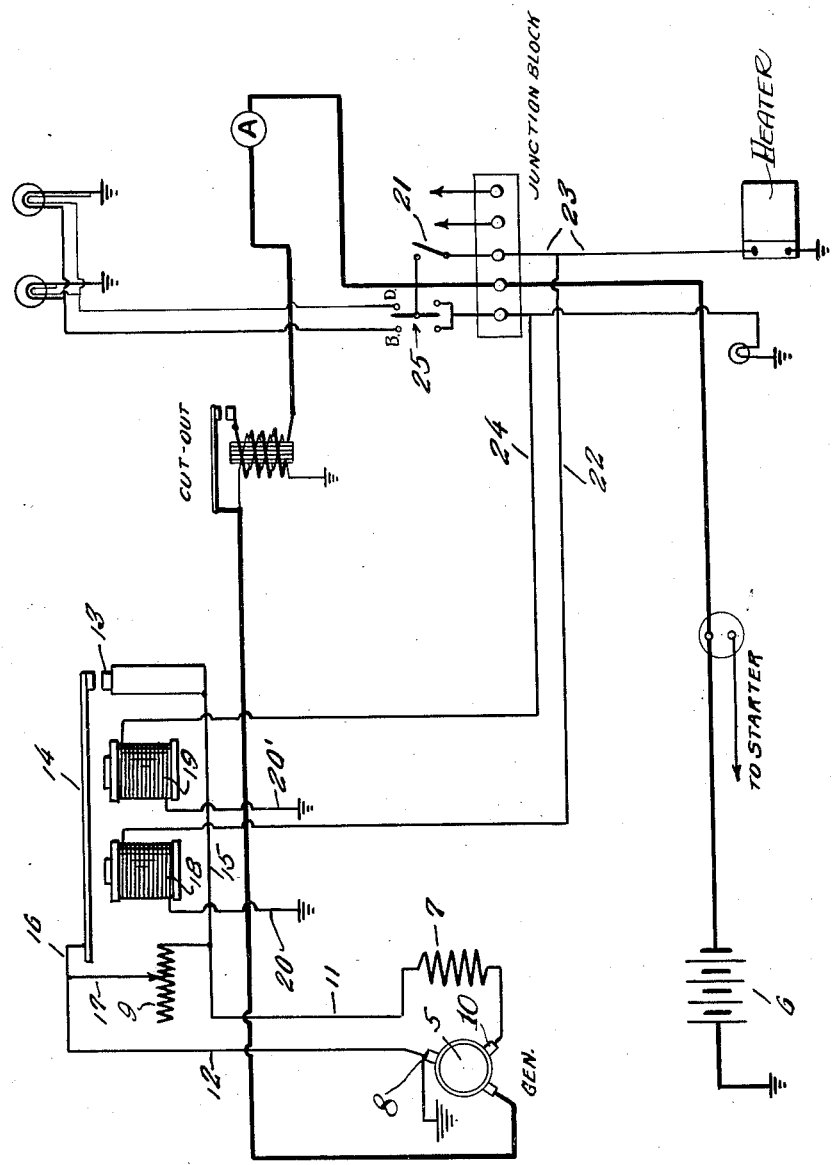
Inventor
Charles Pilkington
By Clarence A. O'Brien
Attorney Patented Apr. 21, 1936

2,038,195

UNITED STATES PATENT OFFICE 2,038,195

ELECTRIC SYSTEM FOR VEHICLES

Charles Pilkington, Madison, Tenn.

Application April 11, 1935, Serial No. 15,903

1 Claim. (Cl. 171—313)

This invention relates to electric system for vehicles, and of the kind in which a storage battery is charged by a direct-current generator.

More particularly, the invention is concerned with what may be termed an automatic generator and light load compensator for automobiles, the object of the invention being to insure against burning out either the battery or generator as now often results, especially in connection with the electrical system of motor trucks, busses and pleasure vehicles as a result of a great deal of driving in the daytime.

The device of the present invention will also be found desirable since its use will permit the providing of the automobile with such accessories as a radio, electric heater or the like and without danger of constant overcharging of the battery or burning out of the generator; and will also be desirable from the standpoint that the invention will eliminate the need of driving in the daytime with the lights on as is now generally practiced by motorists, busses, motor trucks and the like to prevent overchanging of the battery or burning out of the generator, due to excessive daytime driving. The invention contemplates the provision of a variable resistance which is connected in series with the shunt field of a three brush generator, an electrical make and break switch connected in shunt with the variable resistance and a magnet for controlling the electrical make and break switch, and which magnet has a high resistance winding connected either in parallel with the lights of the automobile lighting system or an electrically operated automobile accessory to the end that upon a closing of such circuit the magnet will be energized to close the make and break switch which latter is normally maintained in open position, and with the result that the resistance will be shortened out to increase the output of the generator when the lights of the automobile are turned on or any of the automobile accessories, such as electric heater, radio, etc., are in use; and whereby when the lights of the vehicle are turned off or the circuit for any such accessories is opened, the make and break device will automatically open to the end that the output of the generator will then decrease sufficiently for supplying a charge to the battery at a rate necessary to maintain the battery sufficiently charged for day driving only or for driving when such accessories are not being used.

The invention together with its objects and advantages will be best understood from a study of the following description taken in connection with the accompanying drawing wherein the single view is an electrical diagram of connections illustrating the manner of applying the invention.

In the drawing, wherein for the purpose of illustration is shown a typical electrical system for automobiles, the numeral 5 indicates generally the commutator of a generator of the type usually installed as standard equipment in a motor vehicle and which is driven by the motor thereof. The battery or source of supply charged by the generator is indicated by the reference numeral 6. The generator is provided with a shunt field winding 7 which is, in the usual manner, connected with the third brush 10 of the generator and has its outer terminal connected in series with a variable resistance 9 and one of the main or output brushes 8 of the generator through the conductors 11 and 12. A make and break switch is also provided and consists of a stationary contact 13 and a resiliently mounted armature contact 14. This make and break switch is connected in shunt with the variable resistance 9 through a conductor 15 which is connected to one terminal of the variable resistance 9 and a conductor 16 which is connected to the variable switch arm 17 of the variable resistance.

The opening and closing of the associated contacts 13 and 14 of the make and break switch, in accordance with the present invention, may be controlled by one or more individual magnets, and in the present instance, this control of the make and break switch is accomplished through the medium of either the magnet 18 or the magnet 19. In this form of the invention, the magnet 18 has one end of its high resistance winding grounded as at 20 while the other end thereof is connected in parallel with an electric heater etc. H of the motor vehicle through conductor 22, a manual switch 21, conductor 23 as clearly indicated in the drawing.

The other magnet 19 may be arranged as shown, in parallel with the vehicle lights, through conductor 24, one terminal of the magnet 19 being grounded as at 20'. The lighting switch is illustrated, and is indicated by the numeral 25.

When installing the device the field regulating brush of the generator is set to the desired output of the generator and the resistance 9 is then adjusted until the desired reading appears on the ammeter and which is a safe charging rate when the contacts 12 and 13 of the make and break switch are open or separated and the circuit of the lighting system or of any of the electrical accessories of the automobile is open.

When however, and as thought to be apparent, the lights of the vehicle are to be turned on, or the circuit through the electric heater or radio is closed, the proper magnet 18, 19 will be energized for closing the make and break switch so that the variable resistance will be shortened out and the charging rate of the generator output will be increased sufficiently to compensate for the load now resulting from the use of the vehicle lights or the use of the radio, electric heater or other accessory. Thus, for example, assuming that it is desired to light the lights of the vehicle, the operator closes the switch 25 thus completing the circuit through the magnet 19 and the lights of the vehicle. Magnet 19 will therefore be energized to attract the armature contact 14 whereby this contact is engaged with the contact 13. As a result of this closing of the make and break switch the variable resistance 9 will be shorted out with the result that charging rate of the generator will be increased an amount sufficient to charge the battery as required. Thus it will be appreciated that with this invention the overcharging of the battery or the burning out of the generator will be substantially entirely eliminated or insured against.

If so desired the variable resistance, magnets 18, 19 and the contacts 13 and 14 of the make and break device may be included within a single housing and reduced to a compact structure or the variable resistance may be mounted as a unit separate from the other mentioned parts.

Having thus described the invention, what is claimed as new is:

A regulating and compensating device for a third brush motor vehicle generator adapted to charge the battery of the motor vehicle, comprising a variable resistance connected in series with the shunt field of the third brush generator, an electrical make and break switch connected in shunt with the variable resistance, and a plurality of magnets for controlling the electric make and break switch, each of said magnets having a high resistance winding connected in parallel with different accessory loads of the motor vehicle to the end that upon a closing of one of the load circuits one of the magnets will be energized to close the make and break switch for shorting out said resistance and thereby increase the output of the generator.

CHARLES PILKINGTON.